(12) United States Patent
Wang

(10) Patent No.: US 10,536,998 B2
(45) Date of Patent: *Jan. 14, 2020

(54) SWITCHING POWER SUPPLY HAVING ACTIVE POWER FACTOR CORRECTION

(71) Applicant: MORNSUN GUANGZHOU SCIENCE & TECHNOLOGY CO., LTD., Guangzhou, Guangdong (CN)

(72) Inventor: Baojun Wang, Guangdong (CN)

(73) Assignee: MORNSUN GUANGZHOU SCIENCE & TECHNOLOGY CO., LTD., Guangzhou, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/070,527

(22) PCT Filed: Aug. 29, 2016

(86) PCT No.: PCT/CN2016/097138
§ 371 (c)(1),
(2) Date: Jul. 17, 2018

(87) PCT Pub. No.: WO2017/124748
PCT Pub. Date: Jul. 27, 2017

(65) Prior Publication Data
US 2019/0029086 A1    Jan. 24, 2019

(30) Foreign Application Priority Data

Jan. 21, 2016 (CN) .......................... 2016 1 0040059

(51) Int. Cl.
*H05B 33/08* (2006.01)
*H02M 1/42* (2007.01)
(Continued)

(52) U.S. Cl.
CPC ......... *H05B 33/0815* (2013.01); *G06F 1/263* (2013.01); *H01F 27/30* (2013.01);
(Continued)

(58) Field of Classification Search
CPC ........ H02M 1/32; H02M 1/34; H02M 7/5387; H02M 1/42; H02M 1/4258; H02M 1/4241;
(Continued)

(56) References Cited

U.S. PATENT DOCUMENTS

2009/0112493 A1* 4/2009 Abdennadher .... G01R 27/2605
702/58
2010/0123448 A1    5/2010 Neidorff et al.
(Continued)

FOREIGN PATENT DOCUMENTS

CN     102594175     7/2012
CN     102761276     10/2012
(Continued)

OTHER PUBLICATIONS

"International Search Report (Form PCT/ISA/210)", dated Nov. 23, 2016, with English translation thereof, pp. 1-6.

*Primary Examiner* — Renan Luque
(74) *Attorney, Agent, or Firm* — JCIPRNET

(57) ABSTRACT

A switch power supply having active power factor correction is provided, including a power factor correction (PFC) circuit, a filter circuit, a main power stage, a first capacitor and an indicating circuit. The indicating circuit consists of a light emitting diode (LED) and an inductor; and the current direction of power supplied from the PFC circuit to the main power stage through the inductor is opposite to the conduction direction of the LED. The filter circuit at least comprises an electrolytic capacitor. When the electrolytic capacitor is normal, the LED does not emit light. When the equivalent (Continued)

series resistance (ESR) of the electrolytic capacitor sharply rises, the exciting current appears in the inductor. When a power transistor in the main power stage is switched off, the exciting current passes through the LED for freewheeling and enables the LED to emit light.

20 Claims, 12 Drawing Sheets

(51) Int. Cl.
H02M 1/32 (2007.01)
H02M 3/337 (2006.01)
H02M 1/00 (2006.01)
G06F 1/26 (2006.01)
H01F 27/30 (2006.01)

(52) U.S. Cl.
CPC ........... *H02M 1/32* (2013.01); *H02M 1/4208* (2013.01); *H02M 1/4225* (2013.01); *H02M 1/4266* (2013.01); *H02M 3/337* (2013.01); *H05B 33/0809* (2013.01); *H02M 2001/007* (2013.01); *H02M 2001/0058* (2013.01); *H02M 2001/0064* (2013.01); *Y02B 70/126* (2013.01)

(58) Field of Classification Search
CPC .. H02M 7/217; H02M 3/335; H03K 17/0822; H01G 2/14; H02H 7/16; H02H 9/06; H02H 1/0015; H02H 3/006; H02H 7/1227; G01R 31/026; G01R 31/025; G01R 31/02; G01R 31/11; G01R 31/08; G01R 15/181; G01R 27/205; G01R 31/343; G01R 31/028; G01R 31/003; G01R 31/00; G01R 19/16533; B61L 5/1881; G08B 17/00; G08B 17/10; G05F 1/56; G05F 1/565; H01J 40/14; H05B 33/0815; H05B 33/0803; Y02B 70/126; H01H 9/161

See application file for complete search history.

(56) References Cited

U.S. PATENT DOCUMENTS

| | | | |
|---|---|---|---|
| 2012/0063171 A1* | 3/2012 | Lee | G02B 6/0025 362/622 |
| 2012/0063174 A1* | 3/2012 | Kuwabara | H02M 1/4225 363/21.02 |
| 2014/0232268 A1* | 8/2014 | Kamoi | H05B 33/089 315/117 |
| 2016/0057824 A1* | 2/2016 | Hu | H05B 33/0815 315/210 |
| 2016/0088693 A1* | 3/2016 | Zhao | H05B 33/0818 315/51 |
| 2016/0381745 A1* | 12/2016 | O'Neil | H05B 33/0845 315/85 |
| 2017/0223788 A1* | 8/2017 | Jamsa | H05B 33/0815 |

FOREIGN PATENT DOCUMENTS

| | | |
|---|---|---|
| CN | 103390879 | 11/2013 |
| CN | 103605084 | 2/2014 |
| CN | 105491728 | 4/2016 |
| CN | 105527524 | 4/2016 |
| CN | 105577003 | 5/2016 |
| CN | 105676936 | 6/2016 |
| CN | 105676937 | 6/2016 |
| CN | 205490207 | 8/2016 |
| CN | 205491305 | 8/2016 |
| JP | 2012142132 | 7/2012 |

* cited by examiner

SWITCHING POWER SUPPLY HAVING ACTIVE POWER FACTOR CORRECTION

CROSS-REFERENCE TO RELATED APPLICATION

This application is a 371 application of an international PCT application serial no. PCT/CN2016/097138, filed on Aug. 29, 2016, which claims priority to and the benefit of China Patent Application No. CN 201610040059.2, filed on Jan. 21, 2016. The entirety of each of the abovementioned patent applications is hereby incorporated by reference herein and made a part of this specification.

TECHNICAL FIELD

The present application relates to the field of switching power supplies, and more particularly relates to a high-reliability switching power supply having active power factor correction, which converts alternating current or direct current into direct current.

DESCRIPTION OF RELATED ART

At the present, switching power supplies have a wide range of applications. Fly-back switching power supplies have a wide range of applications to occasions where input power is less than 75 W and have no requirements on Power Factors (PF). For power supplies having the input power more than 75 W, even many switching power supply type drivers for illumination, even though the power less than 75 W, have requirements on their power factors according to the national standard.

Currently, a power factor correction circuit has been adopted to solve this problem. The power factor correction circuit is called PFC (Power Factor Correction) circuit for short. A low-cost method is as follows: an inductor is connected in series between a rectifying bridge and a filter capacitor. Since all of them are passive devices, the method is still called passive power factor correction. Active Power Factor Correction (APFC) is generally defined as: a DC-DC switching converter is connected between a rectifier and a load, and by applying a current feedback technology, the waveform of the current $i_i$ of the input end is able to track a sinusoidal voltage waveform of an alternating current input, so that $i_i$ can approximate to a sine wave. Therefore, the Total Harmonic Distortion (THD) of the current of the input end is less than 5 percent, and the power factor may be increased to 0.99 or higher. Because of the use of active devices, this solution is called active power factor correction. Generally, a PF value may meet the standards of many countries when made to be more than 0.9. If the load is a switching power supply, the system is a switching power supply having the active power factor correction, and is also called two-stage conversion. A second-stage switching power supply used as a first-stage PFC load is generally called a main power stage converter, which is called a main power stage for short.

Even if a power factor correction inductor is connected in series into the rectifying bridge, it still belongs to the passive power factor correction instead of the active power factor correction. People define switching power supplies which filter right after rectifying and switching power supplies which perform filtering after power factor correction inductors are connected in series into the rectifying bridges as direct filtering type switching power supplies because these switching power supplies only have one-stage power conversion circuits.

FIG. 1 shows a mainstream Boost APFC circuit, which is generally written as Boost PFC circuit, because a circuit having a Boost circuit must be an active power factor correction circuit. The output end Vo of the circuit as shown in FIG. 1 is connected with other power stage DC-DC converters, namely main power stages which are standard switching power supplies having the active power factor correction. A fly-back converter, a half-bridge converter, an LLC (Logic Link Control) converter, an asymmetric half bridge and a single-transistor forward circuit may all become main power stages.

The rectifying bridge Z101 generally consists of four rectifying diodes. FIG. 4-1, FIG. 4-2 and FIG. 4-3 in the description of a granted invention No. 201210056555.9 provide several publically known drawing methods of the rectifying bridge. An electrolytic capacitor has a very large capacitance per unit volume, so that the switching power supply having the active power factor correction also adopts the electrolytic capacitor. C101 in FIG. 1 is a PFC filter capacitor, which is generally an electrolytic capacitor.

The working principle of a traditional BOOST power factor correction circuit may refer to page 190 and page 191 of *The Principle and Design of Switching Power Supplies* ISBN 7-121-00211-6 published by the Electronic Industry Press.

It requires that a BOOST power factor correction circuit adopts an electrolytic capacitor having the withstand voltage as high as or higher than an input alternating current peak value. For mains supply of 220 VAC in China, considering that the voltage might rise to 264 VAC occasionally, with a peak value of 373 V, an electrolytic capacitor with the withstand voltage of 400 V or above should be used as an output filter capacitor of the BOOST power factor correction circuit. To obtain a good power factor, the output voltage of the BOOST power factor correction circuit is generally set at about 400 V, and the used electrolytic capacitor generally has the withstand voltage of 450 V. Some manufacturers produce electrolytic capacitors with the withstand voltage of 420 V correspondingly. The output voltage, which has been as high as 400 V, of the BOOST power factor correction circuit is a nuisance for subsequent topology selection for the second-stage main power stage. For example, the output voltage of a computer is 12 V, 5 V and 3.3 V, so that it requires to take a high-withstand-voltage, high-current and low-internal-resistance MOS (Metal Oxide Semiconductor) transistor as a switching transistor to reduce 400 V to such a low voltage. Just because of this, the researches on BUCK power factor correction circuit are increasing around the world.

For example, a description disclosed by a United States patent CONTROLLED ON-TIME BUCK PFC No. US 2010123448 describes a BUCK PFC circuit. In its disclosed technical solution, a BUCK circuit is used, a switch of which is controlled by a PWM (Pulse Width Modulation) mode; and furthermore, at the peak value of input pulsating direct current voltage, the duty ratio is relatively the largest.

For another example, the BUCK PFC circuit No. 201210271808.4 granted in China is also a BUCK power factor correction circuit which also takes the electrolytic capacitor as the filter capacitor for the PFC.

With the popularization of intelligent systems in the industrial field, the electrolytic capacitor used as the filter capacitor for the PFC has exposed its disadvantages accordingly. Because of the use of the electrolytic capacitor C101, its characteristics limit the use of the switching power supply. It has been always an industrial problem to prolong the low and high-temperature service lives of the electrolytic capacitor. It is well known that the electrolytic capacitor C101 generally has the withstand voltage of 400 to 450 V, but an electrolytic capacitor having the withstand voltage higher than 250 V usually only works at a temperature as low as −25 degrees celsius. That is to say, under an environment with a temperature of −40 degrees celsius, such as three provinces in the northeast of China, Xinjiang, and countries and regions at high latitudes, it becomes a tough thing to use the switching power supply. Of course, a CBB thin film capacitor may be used for filtering, but it is extremely large in volume and extremely high in cost.

For the switching power supply adopting the BUCK power factor correction circuit, the BUCK PFC has a low output voltage, so that the PFC electrolytic capacitor for filtering is required to bear higher ripple current, and the problem on the service life of the PFC electrolytic capacitor cannot be ignored either.

Of course, there is another kind of power factor correction circuit taking BUCK-BOOST as its main topology, which may realize voltage drop and voltage rise, but this circuit has not been popularized because of its complexity of control.

For convenience, the switching power supply having the active power factor correction can be simply divided into three parts: a power factor correction circuit, a filter circuit and a main power stage. As shown in FIG. 1, rectifying bridges Z101 and L101, a diode D101, a switching transistor Q101 and a PWM control circuit form the power factor correction circuit. In this application, to facilitate descriptions, the electrolytic capacitor C101 for filtering, which originally belongs to the power factor correction circuit, is independently disposed, and is deemed as the filter circuit. The filter circuit may be an electrolytic capacitor, or formed by connecting an electrolytic capacitor and a high-voltage chip capacitor in parallel, or formed by connecting an electrolytic capacitor and a CBB type thin film capacitor in parallel, or a π-shaped filter circuit, or formed by connecting low-voltage electrolytic capacitors in series and then connecting the whole with other high-voltage capacitors in parallel. The other power stage DC-DC converters connected with the output end Vo of the circuit as shown in FIG. 1 are the main power stages.

When designing a switching power supply, the problem on the service life of the electrolytic capacitor C101 often comes up. In actual use, many switching power supplies cannot be used for the due service lifetime, and it is mainly because their electrolytic capacitors for filtering fail in advance. In many occasions having relatively high requirements, a redundant design is adopted, namely two switching power supplies are used as mutual spares. If one of the switching power supply is out of work, the other one still can work normally, but the cost is relatively high, and it is inconvenient to prepare spares because people still cannot know when the other switching power supply would fail.

On a common non-redundant design occasion, the failure of the switching power supply may cause many associated failures, so that the loss would be increased. Statistically, the failure of a qualified switching power supply is 97 percent or above caused by the first failure of the electrolytic capacitor for filtering.

The existing switching power supply using the electrolytic capacitor cannot effectively forecast the failure of the electrolytic capacitor.

SUMMARY OF THE INVENTION

In view of this, in order to solve the shortcomings of an existing switching power supply having active power factor correction, the present application provides a switching power supply having active power factor correction, which may provide indications before an electrolytic capacitor for filtering fails completely, so as to realize forecasting before the switching power supply fails completely.

The objective of the present application is realized as follows: a switching power supply having active power factor correction comprises a power factor correction circuit, a filter circuit, a main power stage, a first capacitor and an indicating circuit having two terminals. An alternating current input is connected to the first capacitor through the power factor correction circuit, and then is connected to the filter circuit through the indicating circuit; the filter circuit is connected in parallel with the main power stage. The switching power supply is characterized in that: the filter circuit at least comprises a second capacitor used as an electrolytic capacitor; and the indicating circuit is formed by connecting a light emitting unit having unidirectional conductivity to a first inductor in parallel, and makes sure that the current direction of power supplied from the power factor correction circuit to the main power stage through the first inductor is opposite to the conducting direction of the light emitting unit.

Preferably, the switching power supply having the active power factor correction is characterized in that the light emitting unit is a light emitting diode.

Preferably, the switching power supply having the active power factor correction is characterized in that the light emitting unit is formed by connecting a light emitting diode with a first diode in series in the same direction.

Preferably, the switching power supply having the active power factor correction is characterized in that the light emitting unit is formed by connecting a light emitting diode, a first diode and a first resistor in series in the same direction.

Preferably, the switching power supply having the active power factor correction is characterized in that the light emitting unit comprises a light emitting diode, a first diode, a first resistor and a third capacitor, a connection relation among which is as follows: the light emitting diode and the resistor are connected in series with each other, and then are connected in parallel with the third capacitor to form a third network which is then connected in series with the diode in the same direction, thereby forming the light emitting unit.

Preferably, the switching power supply having the active power factor correction is characterized by, in the non-isolation solution above and the isolation solution below, further including a second resistor, wherein two ends of the light emitting diode are connected in parallel with the second resistor.

Preferably, the switching power supply having the active power factor correction is characterized in that in the non-isolation solution above and the isolation solution below, the light emitting diode is a light emitter in a photocoupler, namely a light emitting diode in the photocoupler.

The present application further provides a switching power supply having active power factor correction. An indicating circuit realizes an isolation function, and the switching power supply comprises a power factor correction circuit, a filter circuit, a main power stage, a first capacitor and the indicating circuit having two terminals. An alternating current input is connected to the first capacitor through the power factor correction circuit, and then is connected to the filter circuit through the indicating circuit; and the filter circuit is connected in parallel with the main power stage. The switching power supply is characterized in that the filter circuit at least comprises a second capacitor used as an electrolytic capacitor; the indicating circuit comprises a first terminal, a second terminal, a first transformer and a first light emitting diode; the first transformer at least comprises a primary winding and a secondary winding; the first light emitting diode is connected in parallel with the secondary winding of the first transformer, and the terminal, which is connected with the cathode of the first light emitting diode, of the secondary winding is used as a dotted terminal; the dotted terminal corresponding to the primary winding is used as the first terminal, and the other terminal of the primary winding is used as the second terminal; and furthermore, it ensures that current input by direct current flows in through the first terminal, then flows through the primary winding, and flows out from the second terminal.

Preferably, the switching power supply having the active power factor correction further comprises a first diode, a connection relation of which is as follows: the first diode is connected in series with the first light emitting diode in the same direction to form a first network; and the first network is connected in parallel with the secondary winding of the first transformer, and the terminal, which is connected with the cathode of the first network, of the secondary winding is used as a dotted terminal; and the dotted terminal corresponding to the primary winding is used as the first terminal, and the other terminal of the primary winding is used as the second terminal.

Preferably, the switching power supply having the active power factor correction further comprises a first resistor, a connection relation of which is as follows: the first diode, the first light emitting diode and the first resistor are connected in series in the same direction to form a second network; the second network is connected in parallel with the secondary winding of the first transformer, and the terminal, which is connected with the cathode of the second network, of the secondary winding is used as a dotted terminal; and the dotted terminal corresponding to the primary winding is used as the first terminal, and the other terminal of the primary winding is used as the second terminal.

Preferably, the switching power supply having the active power factor correction further comprises a third capacitor, a connection relation of which is as follows: the first light emitting diode and the first resistor are connected in series, and then are connected in parallel with the third capacitor to form a third network which is then connected in series with the first diode in the same direction to form a fourth network; the fourth network is connected in parallel with the secondary winding of the first transformer, and terminal, which is connected with the cathode of the fourth network, of the secondary winding is used as a dotted terminal; and the dotted terminal corresponding to the primary winding is used as the first terminal, and the other terminal of the primary winding is used as the second terminal.

The working principle will be described in detail in combination with embodiments.

The present application has the beneficial effects as follows.

The cost is extremely low, and the additionally arranged indicating circuit is low in loss, which nearly has no influence on the efficiency of the original switching power supply having the active power factor correction. The switching power supply is simple in wiring, small in volume and convenient to use. Moreover, compared with the prior art, the switching power supply also has the advantages that: before the electrolytic capacitor fails, the light emitting diode of an indicating lamp emits light or current flows through the light emitting diode in the photocoupler, and the photocoupler outputs an isolated signal to notify a user or a circuit.

BRIEF DESCRIPTION OF THE DRAWINGS

FIG. 9 is a specific circuit diagram of the indicating circuit, in which an LED (Light Emitting Diode) is connected in parallel with the inductor, in FIG. 9.

DETAILED DESCRIPTION OF THE PREFERRED EMBODIMENTS

First Embodiment

Figure 2:
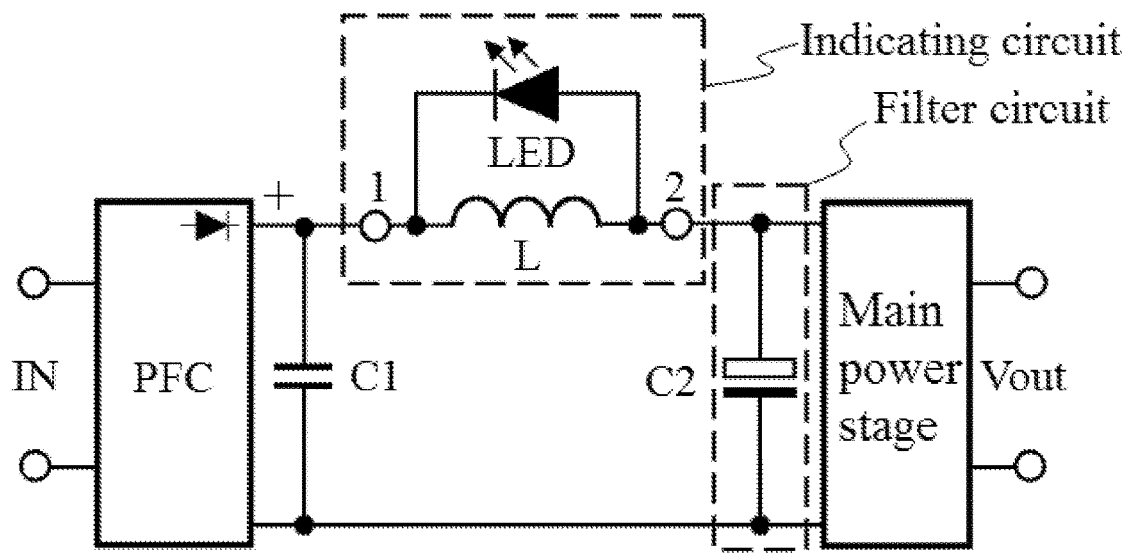
FIG. 2 is a schematic diagram of a switching power supply having active power factor correction of a first embodiment of the present application.

FIG. 2 shows a schematic diagram of a switching power supply having active power factor correction of a first embodiment of the present application. The switching power supply comprises a power factor correction circuit PFC, a filter circuit, a main power stage, a first capacitor C1 and an indicating circuit having two terminals 1 and 2. An alternating current input IN is connected to the first capacitor C1 through the power factor correction circuit PFC, and then is connected to the filter circuit through the indicating circuit; the filter circuit is connected in parallel with the main power stage; the filter circuit at least comprises a second capacitor C2 used as an electrolytic capacitor; and the indicating circuit is formed by connecting a light emitting unit having unidirectional conductivity to a first inductor L in parallel, and makes sure that the current direction of power supplied from the power factor correction circuit PFC to the main power stage through the first inductor is opposite to the conducting direction of the light emitting unit.

Figure 1:
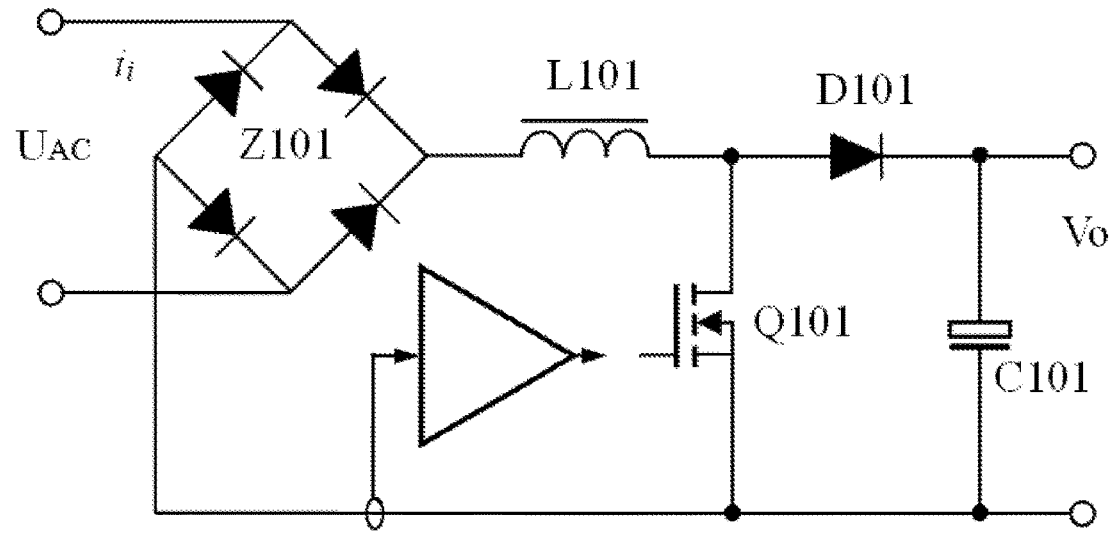
FIG. 1 is a schematic diagram of a PFC part of an existing switching power supply having active power factor correction.

The capacitor C2 corresponds to C101 in FIG. 1.

The light emitting unit here is only a light emitting diode LED which has the unidirectional conductivity. The cathode of the light emitting diode LED is connected to the current flow-in end of the first inductor L, namely to the terminal 1 of the indicating circuit in the figure; the terminal 1 is connected to + of the output of the PFC, and the anode of the light emitting diode LED is connected to the current flow-out end of the first inductor L, namely to the terminal 2 of the indicating circuit in the figure, thereby according with the condition that: the current direction of the direct current input $U_{DC}$ passing through the first inductor L is opposite to the conducting direction of the light emitting unit.

The filter circuit is connected in parallel with the main power stage. During parallel connection, reverse connection is not allowed. It is a basic skill for a person skilled in the art to make sure that the main power stage is not connected reversely.

The light emitting diode LED is a Φ3 mm one, in red with high brightness. For the purpose of convenience, the light emitting diode is LED for short. The type of the LED is 3AR2UD. The inductor adopts a 33 uH I-shaped inductor to make sure that low-frequency pulsating direct current for charging still contains a large amount of high-frequency current flowing into the indicating circuit from the first terminal 1 and then flowing out from the second terminal 2, and also ensures that exciting current of the main power stage of a fly-back power supply does not directly pass through the indicating circuit, so that it is a foolproof indication for avoiding a lead wire of the electrolytic capacitor C2 from remaining too much.

The PFC circuit and the main power stage adopt power supply internal unit circuits PS-2181-01 produced by the Lite-on Technology Corporation, and have outputs at 12 V and 180 W. The power supply is synchronously rectified by adopting the PFC, the LLC and the secondary side; the working frequency of the PFC is 65 KHz, and the main power stage of the LLC is also approximately at this frequency. The frequency varies with different loads. Under 220 VAC, the efficiency is up to 93.75 percent, and the electrolytic capacitor C2 for filtering is 150 uF/400 V. The capacitor C1 is a substitute for an X capacitor 224, and has the capacitance of 0.22 uF.

When the first embodiment is powered, indexes of all aspects are all the same as those in the prior art (the prior art is to cause short circuit in the inductor L) according to actual measurement. Particularly, the conversion efficiency has no visible reduction, and the LED does not emit light.

To verify that the present application can work, the inventor adopts an original method to test the first embodiment:

It is difficult to find out a failed electrolytic capacitor, so that an adjustable resistor is connected in series into the electrolytic capacitor for filtering to simulate an electrolytic capacitor with lowered performance. The resistance value of the adjustable resistor may be adjusted within a range of 0 to 39Ω. When the resistance value of the adjustable resistor is adjusted to 5Ω, the ESR of the electrolytic capacitor at 150 uF/400 V has risen to 5.5Ω from the qualified 0.2Ω equivalently, and the electrolytic capacitor is on the edge of failure.

At this time, the LED in FIG. 2 emits light, and an average value of the working current is 4.3 mA according to actual measurement. The indicating sensitivity is initially adjusted by selecting inductors L having different inductances. Low inductance of the inductor L leads to low sensitivity, and the high inductance of the inductor L leads to high the sensitivity. When the LED is emitting light, there is a forward voltage drop of 1.6 to 2.2 V, so that the sensitivity may be adjusted completely by connecting a resistor to the two ends of the LED in parallel. In this embodiment, if the resistor of 1.6 K is adopted, voltage generated by current of 1 mA or below at two ends of the parallelly-connected resistor is 1.6 V or below, and at this time, the LED does not emit light.

Remark: the conducting voltage drop of a white-light LED is about 3.0 V, and a red one and a green one also have different voltage drops. The conducting voltage drop of the LED inside the photocoupler is about 1.1 V.

Therefore, after the performance of the electrolytic capacitor is reduced, the LED may emit light, indicating that the current of the LED flows from the anode of the LED to the cathode, namely in FIG. 2, there exists a current flowing from the terminal 2 to the terminal 1 through the LED.

Remark: before this application, people skilled in the art think that the electrolytic capacitor still has a filter function when its ESR rises to the failure edge, so that it is impossible to generate current in such a flowing direction. However, these people have ignored a very subtle factor that the freewheeling current in the inductor L may generate a voltage drop on the ESR at the moment that a main power switching transistor in the main power stage is changed from a conducting state into a switched off state. The inventor makes use of this voltage drop to drive the LED to be an indicating lamp. However, the people skilled in the art must adopt a complicated online detection circuit to achieve the objective of the present application before this application, and it is inevitable to cause defects such as reduction of the efficiency of a product, enlargement of the volume and increase of the cost after this technical solution is introduced into the switching power supply.

The working principle firstly put forward by the inventor of the application will be described below to describe where this current is from.

Referring to FIG. 2, when the electrolytic capacitor C2 is normal, after high-frequency current generated by the PFC circuit is initially filtered by the capacitor C1, its direct current component is extremely complicated, the base frequency of which is twice the mains supply, and the direct current component is also pulsating direct current, the pulsation cycle of which is twice the mains supply. As the capacitor C2 has a relatively small capacitance value, the current flowing through the inductor L also contains high frequency ripple current at the working frequency of the PFC circuit. The amount of the high frequency ripple current is relatively small, so that after the current is filtered by the capacitor C2, a little of abruptly changed current exists in the current supplied from the PFC to the electrolytic capacitor C2.

Figure 3:
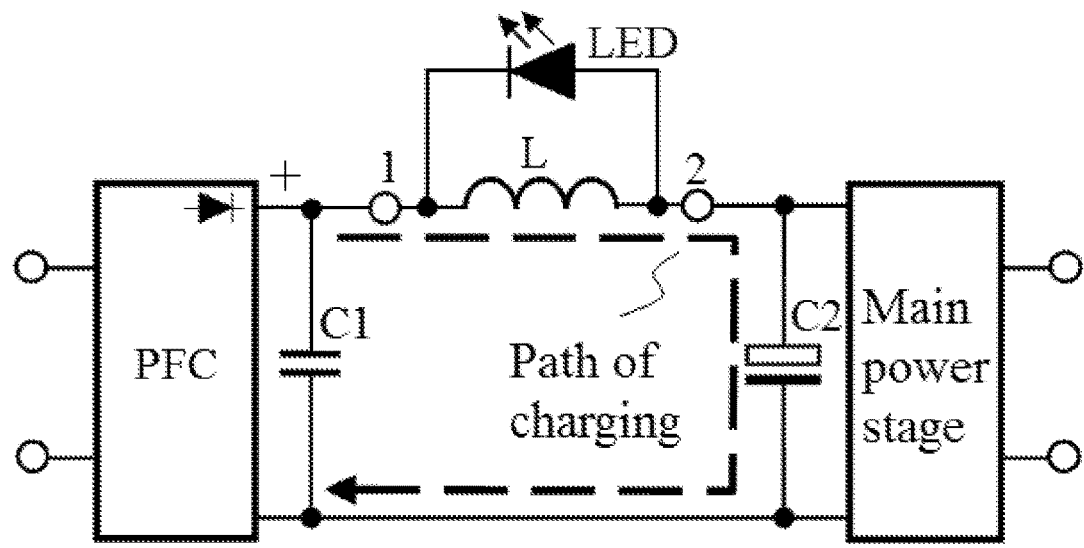
FIG. 3 is a schematic diagram of a path of charging current generated by a capacitor C1 to an electrolytic capacitor in the first embodiment.

The PFC circuit supplements electric energy to the electrolytic capacitor C2 through the inductor L, and a path of charging current is as shown in FIG. 3: flowing out from the positive end+ of the output of the PFC circuit to the first terminal 1 of the indicating circuit, flowing out from the second terminal 2 of the indicating circuit to the anode of the electrolytic capacitor C2 for filtering, and then flowing out from the cathode of the electrolytic capacitor C2 to the negative end of the PFC circuit.

In this process, the charging current is a pulsating direct current with mostly direct current component, and the inductive resistance of the inductor L to the direct current is zero; the frequency of the charging current of the pulsating direct current is 100 or 120 Hz, which is twice the mains supply; and the inductor L is 33 uH, with the inductive resistance of $2 \pi f L$, which is only 13.5 m$\Omega$. The LED is in reversal of biasing, and does not emit light.

Figure 4:
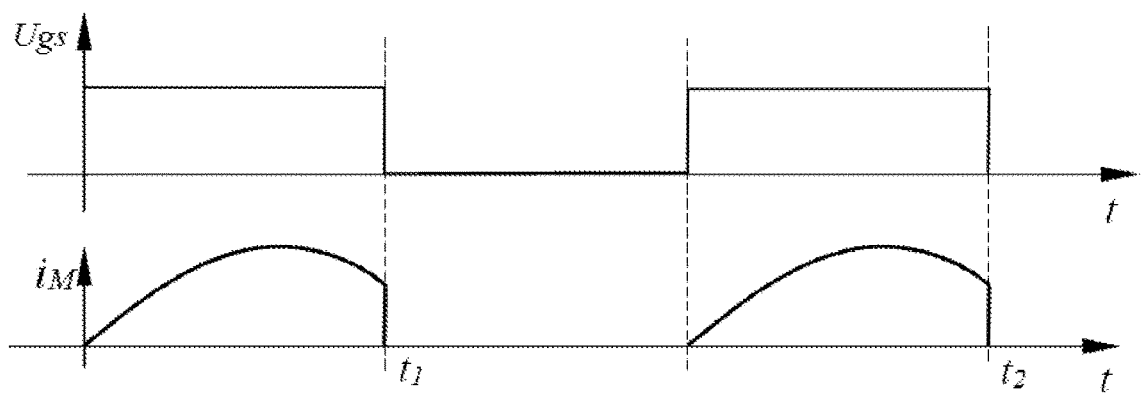
FIG. 4 is a sequence chart of driving voltage and exciting current of a main power stage switching transistor in the first embodiment.
Figure 5:
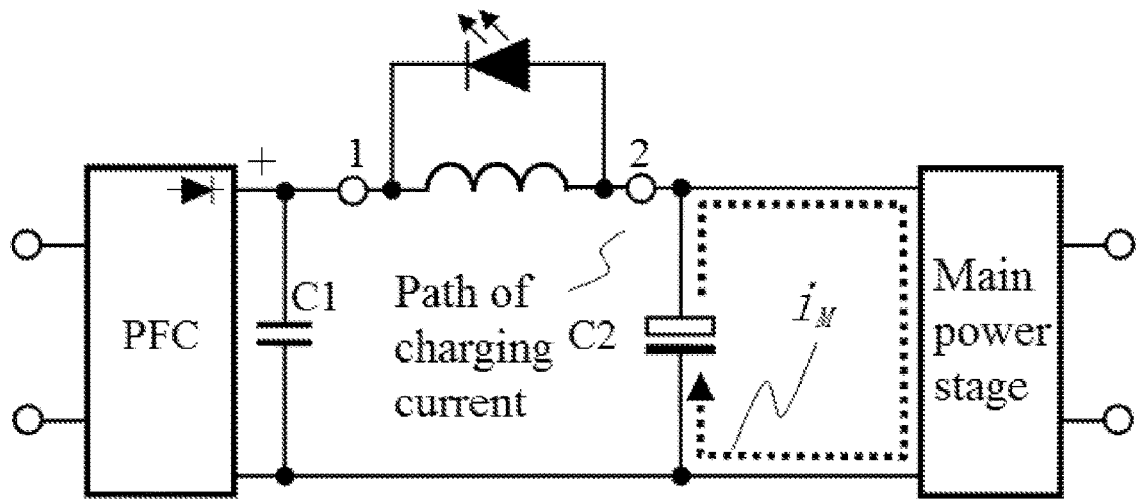
FIG. 5 is a schematic diagram of a path of exciting current $i_M$ of the main power stage when the electrolytic capacitor is normal in the first embodiment.

When the electrolytic capacitor C2 is normal, a electrolytic capacitor at 150 uF/400 V as mentioned previously, its ESR (Equivalent Series Resistance) under 65 KHz is 0.2$\Omega$, namely when an upper transistor of the switching transistor in the main power stage works normally, the waveform of exciting current $i_M$ of the main power stage is as shown in FIG. 4, wherein Ugs is a driving voltage of the gate electrode and the source electrode of the upper transistor of the switching transistor. The path of the exciting current $i_M$ is as shown in FIG. 5. Discharging current of the electrolytic capacitor C2 to the main power stage is also exciting current $i_M$ of the main power stage, which is for instructions only. As the main power stage is an LLC circuit, only when the upper transistor is switched on, the waveform in FIG. 4 is generated.

The capacitive resistance of the electrolytic capacitor C2 under 65 KHz is $1/(2 \pi f C)$, which is calculated as 16.3 m$\Omega$ and is much less than the ESR. Under 65 KHz, the ESR plays the leading role, and the inductive resistance of the inductor L is 13.4$\Omega$.

Therefore, for the high-frequency discharging current at 65 KHz, the total resistance $R_{ALL}$ of the inductor and the capacitor C1 from the right of the inductor L, namely from two ends of the capacitor C2, is no less than 13.4$\Omega$, but the actual total resistance will be higher because this is just an estimation. It is very complicated to calculate the compound resistance. Particularly, the waveform as shown in FIG. 4 is not a sine wave, but its fundamental wave is the sine wave and even its harmonic frequency is more than 65 KHz, resulting in higher inductive resistance, so that it is the estimation here.

Figure 6:
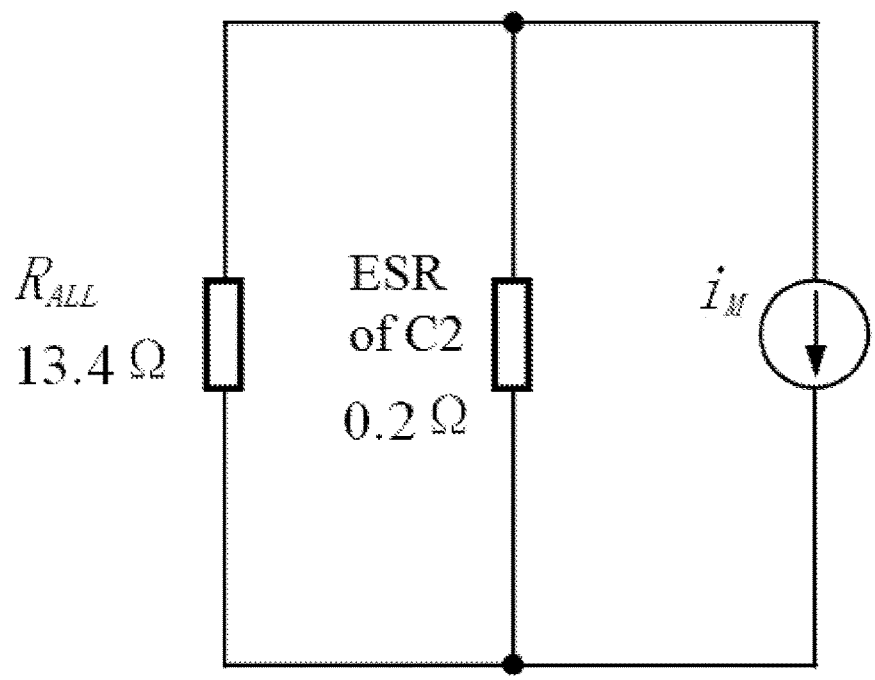
FIG. 6 is an equivalent circuit diagram related to the exciting current of the main power stage in FIG. 5.

An equivalent circuit is as shown in FIG. 6. The exciting current $i_M$ of the main power stage is supplied from two places, one from discharging current $i_{C2}$ of the electrolytic capacitor C2 to the main power stage and the other one supplied by the capacitor C1 through the inductor L and recorded as $i_R$. It can be calculated according to FIG. 5 that $i_{C2}=67$ $i_R$, and 68 $i_R=i_M$, namely $i_R=0.014$ $i_M$.

Under an average input of 380 VDC, the output is 180 W, and the full load maximum duty ratio is 0.34. If the average value of the exciting current $i_M$ of the main power stage is about 484 mA during conducting of the upper transistor of the switching transistor, and is about 1130 mA at $t_1$ or $t_2$ in FIG. 4, the inductor L also has an exciting current, the peak value of which is about $0.014 \times 1,130 = 15.8$ mA at $t_1$ or $t_2$ in FIG. 4. The peak value indicates the time before the moment that the upper transistor of the switching transistor is changed from the conducting state into the switched off state. As the current in the inductor may not be changed abruptly, the current of 15.8 mA in the inductor L would continuously flow forwards. If the ESR of the electrolytic capacitor C2 is zero in an ideal case, the electrolytic capacitor C2 may absorb this current. As the electrolytic capacitor absorbs the current, its terminal voltage would rise, and the varying voltage may be calculated by an equation.

From an energy storage formulas of an inductor and a capacitor and the current may be completely transferred from the inductor to the capacitor, people know that: 0.5 $LI^2=0.5$ $CV^2$ $$0.5\ Li_R^2 = 0.5\ C(V_1^2 - V_2^2).$$

A calculation result is that: the terminal voltage of the electrolytic capacitor rises 0.072 uV. It can be understood that the voltage of the second terminal 2 is 0.072 uV higher than that of the first terminal 1. At this time, the ESR of the electrolytic capacitor C2 plays a leading role for this current, namely a voltage drop on the ESR generated by the current of 10 mA is $$U = IR = 15.8\ \text{mA} \times 0.2\Omega = 0.03\ \text{V}.$$

It can be understood that the voltage of the second terminal 2 is 0.03 V higher than that of the first terminal 1, which is determined by the external freewheeling characteristic of the inductor. This voltage is not high enough to cause forward conduction of the light emitting diode LED, so that the LED still does not emit light.

It can be seen from FIG. 3, FIG. 4 and FIG. 5 that if a circuit board is designed correctly, only a very small part of the discharging current of the electrolytic capacitor C2 to the main power stage flows through the inductor L. During analysis of the working principle, the working principle is similar to that of an existing textbook. In such case, it can be understood that the discharging current of the electrolytic capacitor C2 to the main power stage does not flow through the inductor L, thereby facilitating the understanding of the working principle.

Figure 7:
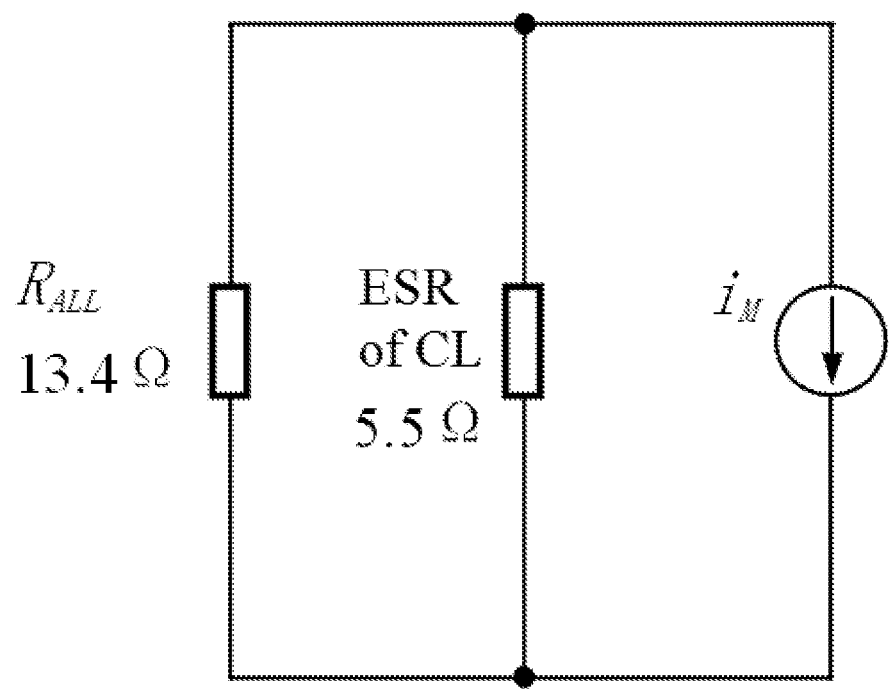
FIG. 7 is an equivalent circuit diagram related to the exciting current of the main power stage after the ESR (Equivalent Series Resistance) of the electrolytic capacitor is increased in the first embodiment.

When the ESR of the electrolytic capacitor C2 has risen to 5.5$\Omega$ from the qualified 0.2$\Omega$, namely the electrolytic capacitor C2 is on the edge of failure, and its equivalent circuit is as shown in FIG. 7. At this time, the exciting current $i_M$ of the main power stage is supplied from two places, one from discharging current $i_{C2}$ of the electrolytic capacitor C2 to the main power stage and the other one supplied by the capacitor C1 through the inductor L and recorded as $i_R$. It can be calculated according to FIG. 7 that $i_{C2}$ is equal to 2.44 $i_R$, and $i_R=0.291$ $i_M$.

At the moment, the inductor L also has an exciting current, the peak value of which is $0.291 \times 1,130 = 329$ mA at $t_1$ or $t_2$ in FIG. 4, namely before the moment that the upper transistor of the switching transistor is changed from the conducting state into the switched off state. As the current in the inductor may not be changed abruptly, the current of 329 mA in the inductor L would continuously flow forwards. If the ESR of the electrolytic capacitor C2 has risen to 5.5$\Omega$, a voltage drop generated by the current of 329 mA on the ESR is $$U = IR = 329\ \text{mA} \times 5.5\Omega = 1.8\ \text{V}.$$

Figure 8:
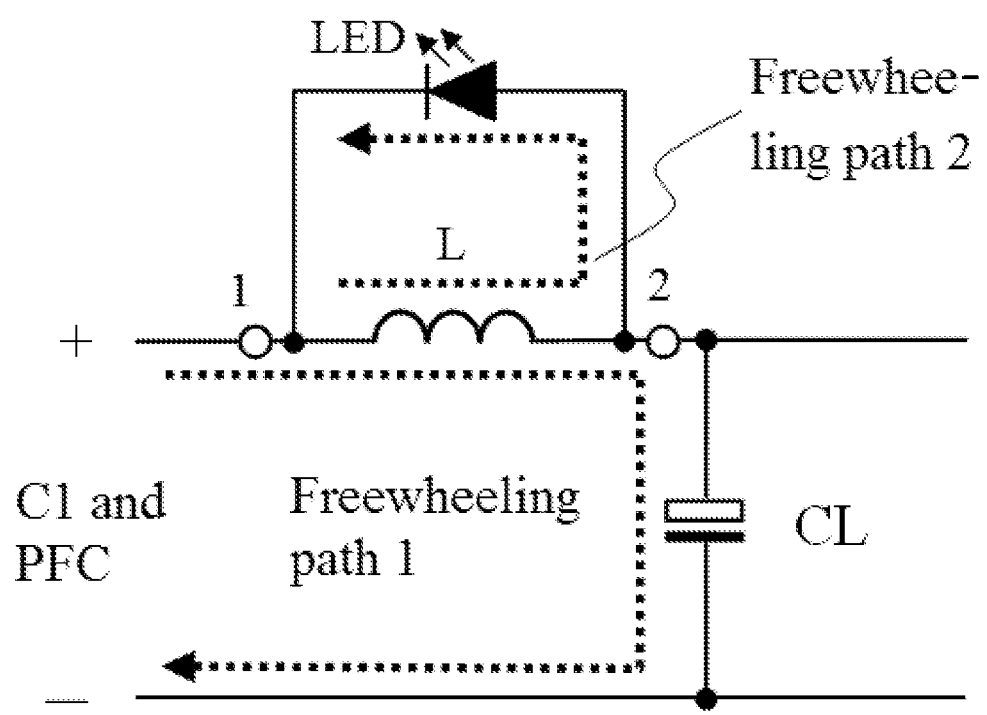
FIG. 8 is a schematic diagram of a path of freewheeling current of an inductor L to the outside at the moment that a switching transistor V is switched off after the ESR of the electrolytic capacitor is increased in the first embodiment.

It can be understood that the voltage of the second terminal 2 of the indicating circuit is 1.8 V higher than that of the first terminal 1, which is determined by the external freewheeling characteristic of the inductor. This voltage is high enough to cause forward conduction of the light emitting diode LED, so that the LED emits light. As shown in FIG. 8, one part of the freewheeling current of the inductor L flows through the LED, as shown in a freewheeling path 2 in the figure, and the other part of the freewheeling current still charges the electrolytic capacitor C2, as shown in a freewheeling path 1 in the figure.

The working principle of the present application is not complicated. If someone reads the above-mentioned analysis of the working principle carefully, it is easy to understand that the current flowing through the inductor may not be changed abruptly, so that when the ESR of the electrolytic capacitor rises, the exciting current obtained in the inductor L is multiplied, from 15.8 mA to 329 mA in the above example, which is twenty times of the original current; at this time, the varying voltage generated on the ESR by the exciting current in the inductor L is higher than a forward light emitting voltage of the LED, so that the freewheeling path 2 is generated to drive the LED to emit light to notify a user that: the ESR of the electrolytic capacitor C2 has risen to a concerning point, which means that the switching power supply having the active power factor correction is going to fail, and the user can decide the next measure. The average value of the current flowing through the LED is 4.3 mA according to actual measurement.

It should be noted that:

at this time, the electrolytic capacitor may still work, but the exciting current of the main power stage generates relatively high heat on the ESR, which is 1.29 W in this embodiment. The electrolytic capacitor at 150 uF/400 V is relatively large in volume and relatively high in heat dissipation performance, but is in accelerated aging under the high heat, so that in general cases, the ESR rises quickly within dozens of hours to hundreds of hours, thereby resulting in higher heat till the electrolytic capacitor fails and loses its capacitance, which may cause a series of failures such as bombing out of the switching transistor.

However, for a circuit using the present application, when the ESR of the electrolytic capacitor rises to a certain preset value, the switching power supply having the active power factor correction of the present application provides a striking indicating lamp, or the LED is replaced by the light emitter in the photocoupler, so that the photocoupler outputs an isolation high or low level to notify the user that: the electrolytic capacitor in the switching power supply is going to fail, thereby realizing effective preinforming, or a circuit in a mother system takes an automatic replacement measure.

It can be seen that the first embodiment may achieve the invention objective.

Figure 9:
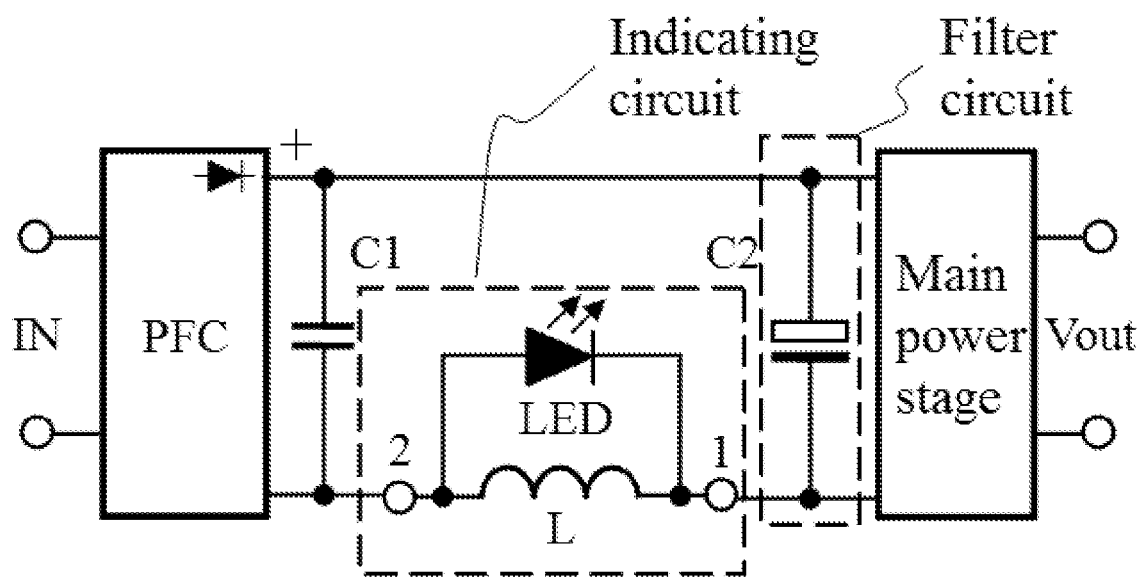
FIG. 9 is another implementation mode of the schematic diagram of the switching power supply having the active power factor correction of the first embodiment, namely the positions of the capacitor C1 and the indicating circuit are switched.

The alternating current input IN is connected to the first capacitor C1 through the power factor correction circuit PFC, and then is connected to the filter circuit through the indicating circuit; and the filter circuit is connected in parallel with the main power stage. There are two implementation modes: one as shown in FIG. 2 and the other one as shown in FIG. 9. Connection to the filter circuit through the indicating circuit is changed into connection to the post-stage indicating circuit through negative of the output of the PFC. FIG. 9 shows a specific connection relation which accords with the following condition that: the indicating circuit consists of the light emitting unit and the first inductor which are connected in parallel with each other, and makes sure that the current direction of power supplied from the PFC to the main power stage through the first inductor is opposite to the conducting direction of the light emitting unit. The light emitting unit in FIG. 9 is relatively simple, which is only the LED. In FIG. 2 and FIG. 9, the power stage may also be replaced by a half-bridge conversion circuit, or a single-transistor forward circuit, or a full-bridge circuit because all circuits may achieve the invention objective according to actual measurement.

Second Embodiment

Figure 10:
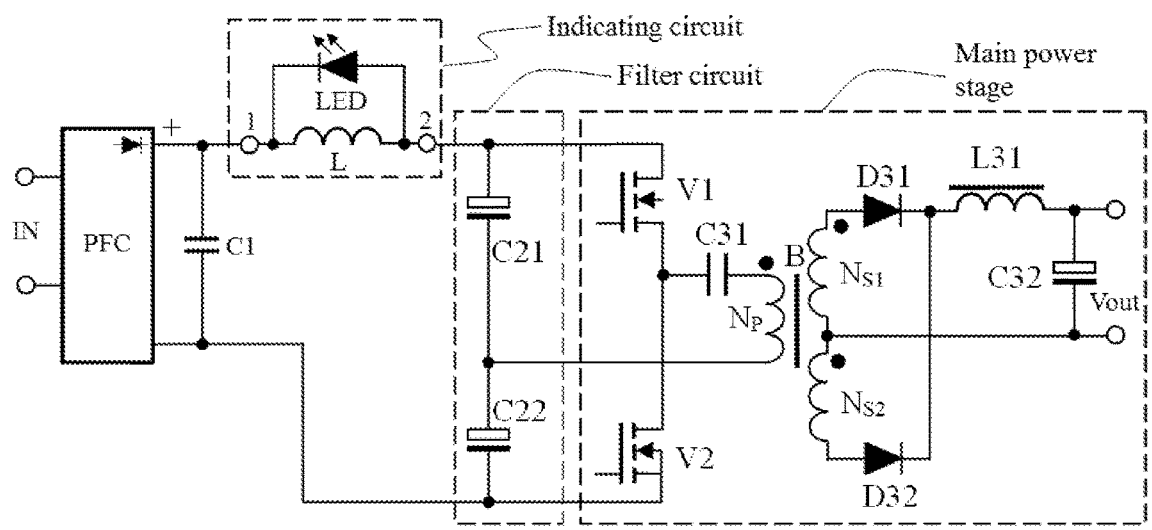
FIG. 10 is a schematic diagram of a switching power supply having active power factor correction of a second embodiment.

The second embodiment is as shown in FIG. 10, which shows a schematic diagram of a switching power supply having active power factor correction of the second embodiment of the present application. The switching power supply comprises a power factor correction circuit PFC, a filter circuit, a main power stage, a first capacitor C1 and an indicating circuit having two terminals 1 and 2. An alternating current input IN is connected to the first capacitor C1 through the power factor correction circuit PFC, and then is connected to the filter circuit through the indicating circuit; the filter circuit is connected in parallel with the main power stage; the filter circuit at least comprises a second capacitor C2 used as an electrolytic capacitor; and the indicating circuit is formed by connecting a light emitting unit having unidirectional conductivity to a first inductor L in parallel, and makes sure that the current direction of power supplied from the power factor correction circuit PFC to the main power stage through the first inductor is opposite to the conducting direction of the light emitting unit.

The filter circuit is connected in parallel with the main power stage. During parallel connection, reverse connection is not allowed. It is a basic skill for a person skilled in the art to make sure that the main power stage is not connected reversely.

As the main power stage is a half-bridge circuit, the filter circuit is also changed.

In order to adapt to a connection mode of the half-bridge circuit, the filter circuit is formed by connecting two electrolytic capacitors C21 and C22 which have the same capacitance and relatively low withstand voltage in series, and a connection point is connected to the half-bridge circuit. No voltage sharing resistor connected in parallel to the electrolytic capacitors is drawn in FIG. 10. The main power stage is a half-bridge converter circuit, C31 is a coupling capacitor for improving the magnetic biasing performance, and the other side of a transformer B is a universal output rectifying circuit.

As the electrolytic capacitors C21 and C22 are equivalent to the original C2 after being connected in series, serial numbers of C2 are used. One more number is added behind C2 to explain that they are devices having same functions and effects in the circuit.

When a power transistor V1 is conducted, in a normal case, energy of the electrolytic capacitor C21 returns to the cathode of the electrolytic capacitor C21 through the anode of the electrolytic capacitor C21, the power transistor V1, the capacitor C31 and the primary side $N_P$ of the transformer B; and if the ESR of the electrolytic capacitor C21 rises to a relatively large value, the capacitor C1 and the electrolytic capacitor C22 are still equivalent to a "power supply" after being connected in series, and this equivalent power supply is still connected in series with the inductor L to participate in excitation; before the moment that the power transistor V1 is switched off, the exciting current of the inductor L may not disappear, but is still freewheeled just like the working principle of the above-mentioned first embodiment. As the ESR of the electrolytic capacitor C21 rises to the relatively large value, part of the freewheeling current lights the LED to achieve the invention objective.

When the power transistor V1 is conducted, a power transistor V2 is switched off at the moment. In normal cases, the energy of the electrolytic capacitor C21 returns to the cathode of the electrolytic capacitor C21 through the anode of C21, the power transistor V1, the capacitor C31 and the primary side $N_P$ of the transformer B. In this process, the electrolytic capacitor C21 may charge C31, resulting in rise of the terminal voltage of C31 and then conduction of the power transistor V2; and at this time, the power transistor V1 is switched off. In normal cases, the energy of the electrolytic capacitor C22 returns to the cathode of the electrolytic capacitor C22 through the anode of the electrolytic capacitor C22, the primary side $N_P$ of the transformer B, the capacitor C31 and the power transistor V2. In this process, the electrolytic capacitor C22 may discharge C31, resulting in reduction of the terminal voltage of C31. If the ESR of the electrolytic capacitor C22 rises to a relatively large value, the capacitor C1 and the electrolytic capacitor C21 are still equivalent to a "power supply" after being connected in series, and this equivalent power supply is still connected in series with the inductor L to participate in excitation; before the moment that the power transistor V2 is switched off, the exciting current of the inductor L may not disappear, but is still freewheeled just like the working principle of the above-mentioned first embodiment. As the ESR of the electrolytic capacitor C22 rises to the relatively large value, part of the freewheeling current lights the LED to achieve the invention objective.

If the ESRs of the electrolytic capacitors C21 and C22 rise at the same time, the second embodiment, by simple analysis, still may achieve the invention objective to light the LED.

The second embodiment is like that as shown in FIG. 9: the indicating circuit is connected to the subsequent filter circuit and the main power stage through negative of the output of the PFC, so that another implementation mode is achieved.

The filter circuit may be formed by serial connection and series-parallel connection of multiple electrolytic capacitors. The filter circuit is formed by a single capacitor in FIG. 2 and FIG. 9, and formed by two serially connected capacitors in FIG. 10.

Referring to FIG. 2, FIG. 9 and FIG. 10, when the power is on, it is very possible that alternating current is in a high-voltage state instead of a zero-volt state. As the terminal voltage of the electrolytic capacitor C2 is zero, and may not be changed abruptly, the current in the inductor L is zero, and may not be changed abruptly. At the electrification moment, in the PFC circuit, when the PFC does not work, a jumper diode is conducted first to charge the filter electrolytic capacitor. The voltage of the capacitor C1 rises fast because of low capacitance. The terminal voltage of the electrolytic capacitor C2 is zero, and rises slowly because of high capacitance! Most of instantaneous voltage may be applied to two ends of the LED to reversely break down the LED. The withstand voltage nominal value of the LED is generally only about 5 to 10 V, and is about 35 V according to actual measurement, and a few of manufacturers can make the value at about 170 V, but the LED still may not bear the peak value of the capacitor C1. An embodiment below is to solve this problem by improving the indicating circuit. For the purpose of convenience, the embodiment is postponed as a third embodiment. It should be noted that all embodiments below must be arranged into the circuits as shown in FIG. 2, FIG. 9 and FIG. 10 to form complete embodiments. For the only purposes of convenience and saving of spaces, descriptions are made below only to embodiments of indicating circuits.

Third Embodiment

Figure 11:
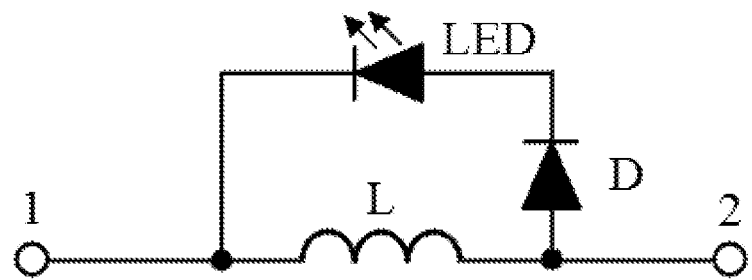
FIG. 11 is a schematic diagram of an indicating circuit in a third embodiment of the present application.

Referring to FIG. 11, it is a schematic diagram of an indicating circuit in the third embodiment of the present application. A light emitting unit is formed by connecting a light emitting diode LED and a first diode D in series in the same direction. A connection relation of the indicating circuit is as follows: the first diode D and the first light emitting diode are connected in series in the same direction to form a two-terminal network which is connected in parallel with an inductor L; a connection point of the cathode of the two-terminal network and the first inductor forms a first terminal 1; and a connection point of the anode of the two-terminal network and the first inductor forms a second terminal 2.

The two-terminal network is: a circuit structure which is formed by interconnecting one or two or more elements and has two terminals.

The anode and the cathode of the two-terminal network are as follows: for the two-terminal network having unidirectional conductivity, when the voltage of the anode is higher than that of the cathode, current may be generated; and when the voltage of the cathode is higher than that of the anode, no current may be generated. A first network, a second network and a fourth network in this application all have the unidirectional conductivity.

Serial connection in the same direction is as follows: two or more two-terminal networks are connected in series, wherein at least two two-terminal networks have the unidirectional conductivity, and may still have the unidirectional conductivity after being connected in series. Positions of all the two-terminal networks in the application may be subjected to permutated combinations which are not enumerated in the embodiments and drawings. The various permutated combinations shall all fall within the scope of protection of the application.

Figure 12:
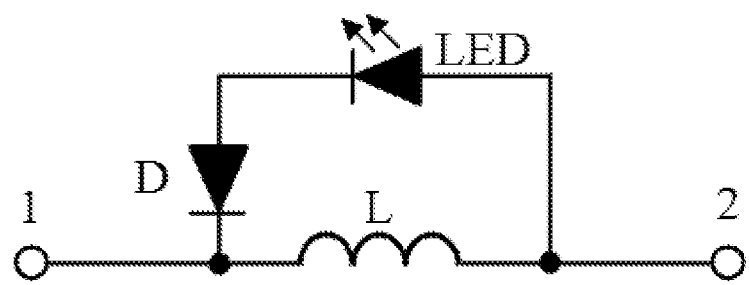
FIG. 12 is another implementation mode of the schematic diagram of the indicating circuit in the third embodiment, namely the positions of an LED and a diode are switched.

Serial connection in the same direction in this embodiment is as follows: the diodes have the unidirectional conduction characteristics, meaning that the cathode of one diode is connected with the anode of the other diode, so that the serially connected two-terminal networks still have the unidirectional conductivity except that the conducting voltage drop is equal to a sum of the original conducting voltage drops of the two diodes. By such serial connection, even if the positions of the two diodes are switched, they still have the unidirectional conductivity, and the withstand voltage is the sum of the withstand voltages of the two diodes. FIG. 12 shows another mode of equivalent serial connection.

The first diode D adopts a diode having the withstand voltage greater than the maximum high-voltage value of a direct current power supply U. In consideration that forward conduction works under the high frequency of the switching power supply, a fast recovery rectifying diode may be adopted, such as 1N4007 having the withstand voltage of 1,000 V, or SF106 having the withstand voltage of 400 V. After the diode is connected in series into the circuit, when power is on, two ends of the first diode D bear high voltage, so that the high voltage reversely breaking down the LED is shared, and the first diode D achieves a protective effect.

In case of relatively high power of the switching power supply, or relatively low working voltage of the capacitor C1, the main power stage generates relatively high ripple current. At this time, the freewheeling current for lighting the light emitting unit may be too high, and common LEDs and light emitters in photocouplers are easy to damage because their maximum bearable current is generally about 50 mA. Therefore, a fourth embodiment is to solve this problem.

Fourth Embodiment

Figure 13:
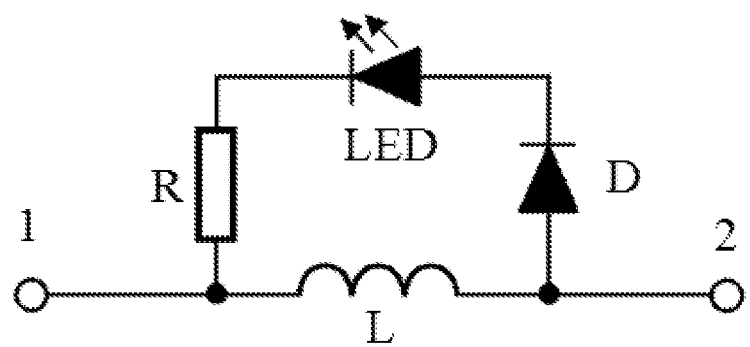
FIG. 13 is a schematic diagram of an indicating circuit in a fourth embodiment of the present application.

Referring to FIG. 13, on the basis of the third embodiment, the indicating circuit further comprises a first resistor R, and the light emitting unit is formed by connecting a light emitting diode LED, a diode D and a resistor R in series in the same direction, a connection relation among which is as follows: the first diode D, the first light emitting diode LED and the first resistor R are connected in series in the same direction to form a new network which is connected in parallel with the first inductor L. Even if the three devices are connected in series, the unidirectional conduction characteristic is still realized. There are six serial connection modes according to a permutated combination method, and they will not be described one by one here. A connection point of the cathode of the light emitting unit and the inductor L forms a first terminal 1, and a connection point of the anode of the light emitting unit and the inductor forms a second terminal 2.

The fourth embodiment arranged into the circuits as shown in FIG. 2, FIG. 9 and FIG. 10 also achieves the invention objective. Due to a current limiting resistor R, in case of relatively high power of the main power stage, or relatively low working voltage of the capacitor C1, the exciting current of the main power stage is relatively high. At this time, if no current limiting resistor R exists, common LEDs and light emitters in photocouplers are easy to damage because their maximum bearable current is generally about 50 mA, and the current limiting resistor R in the fourth embodiment is to solve this problem.

As the main power stage generates high-frequency ripple current, it determines that the current for lighting the LED is high-frequency current instead of direct current, and may easily damage a light emitting diode or a light emitter in the photocoupler which only works at a low frequency, so that a solution of the indicating circuit is provided in a fifth embodiment.

Fifth Embodiment

Figure 14:
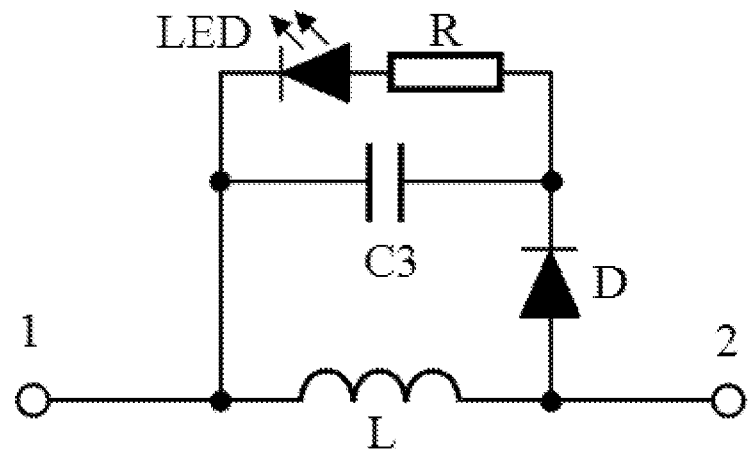
FIG. 14 is a schematic diagram of an indicating circuit in a fifth embodiment of the present application.

Referring to FIG. 14, the indicating circuit comprises a light emitting diode LED, a first diode D, a first resistor R, a first inductor L and a third capacitor C3. A connection relation in the indicating circuit is as follows: the light emitting diode LED and the resistor R are connected in series and then are connected in parallel with the third capacitor C3 to form a third network which then is connected in series with the diode D in the same direction to form a light emitting unit. The light emitting unit is connected in parallel with the first inductor L; and a connection point of the cathode of the light emitting unit and the inductor L forms a first terminal 1, and a connection point of the anode of the light emitting unit and the inductor L forms a second terminal 2.

It can be seen from the above that the third network is as follows: the LED and the resistor R are connected in series, and then are connected in parallel with the capacitor C3. As the capacitor may isolate direct current and connect alternating current, the third network still has the unidirectional conduction characteristic under the direct current. The end where the direct current flows out is the cathode, and the end where the direct current flows in is the anode. Therefore, it is better to understand that the third network still has the unidirectional conductivity after being connected in series with the diode D in the same direction. When the light emitting unit is connected in parallel with the inductor L, the current direction of power supplied from the direct current power supply to the outside through the first inductor should be opposite to the conducting direction of the light emitting unit.

Figure 15:
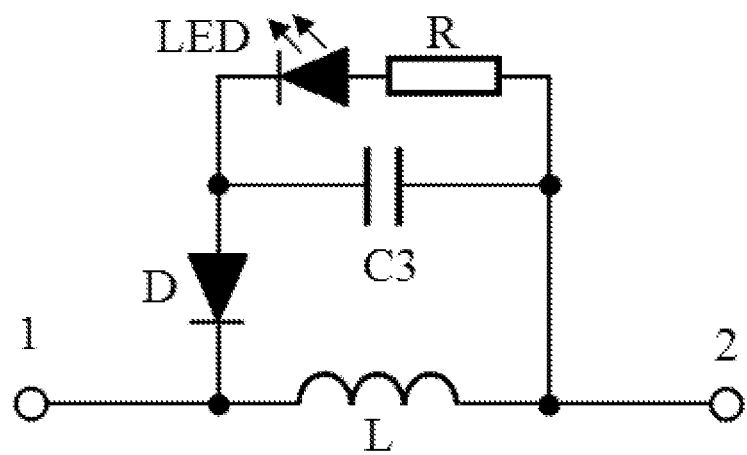
FIG. 15 is another implementation mode of the schematic diagram of the indicating circuit in the fifth embodiment, namely the positions of a diode D and a third network are switched.

There are four connection methods in the fifth embodiment, and all may achieve the invention objective. FIG. 15 shows another circuit formed by connecting the third network with the diode D in series in the same direction. There are also two methods for connecting the first light emitting diode LED with the first resistor R in series, and the methods will not be shown one by one here.

The indicating circuit of the fifth embodiment arranged into the circuits as shown in FIG. 2, FIG. 9 and FIG. 10 also achieves the invention objective. The freewheeling current is first filtered by the capacitor C1, and then is supplied to the LED through the current limiting resistor R, so that the LED obtains smooth direct current, and may emit light stably without a high-frequency current component. If the wire of the LED is relatively long, the wire may not cause high-frequency current radiated to the space, thereby improving the radiation disturbance of the present application and reducing EMI (Electro-Magnetic Interference).

When the LED is replaced by a light emitter in the photocoupler, output current of the photocoupler is also a stable signal which may not make troubles for the subsequent circuit. When the collector electrode of the output end of the photocoupler is connected with a pull-up resistor, and the electrolytic capacitor C2 is on the edge of failure, the collector electrode of the output end of the photocoupler may output a low level, and when the emitting electrode of the output end of the photocoupler is connected with a pull-down resistor, and the detected capacitor is on the edge of failure, the emitting electrode of the output end of the photocoupler may output a high level, so as to inform a subsequent intelligent circuit to take actions, such as sounding an alarm, or automatically switching to another switching power supply, or displaying the level to a screen, and a failure time length of the switching power supply may be indicated according to the size of the current output from the output end of the photocoupler, so as to notify a user to make a further preferred selection of an optimal solution.

Or the LED remains, and two ends of the filter capacitor C1 are then connected in parallel with a second network which is formed by connecting a second resistor with an LED2 in the photocoupler in series. Therefore, both light notifying and a low or high level output may be realized. It can be seen that the light emitting units of the third embodiment, the fourth embodiment and the fifth embodiment arranged into the circuits as shown in FIG. 2, FIG. 9 and FIG. 10 also achieves the invention objective.

By virtue of the inductance, a section of lead wire may be used as the first inductor L on a circuit board. By reasonable design and valuing of other elements, the above-mentioned embodiments of the switching power supply having active power factor correction of the present application may also work normally. Such a mode should also fall within the scope of protection of claims of the present application. Of course, during design of the circuit board, this section of lead wire may be routed on the circuit board according to an inductance mode, thereby increasing the inductance and also achieving the invention objective.

According to the first embodiment to the fifth embodiment, if the LED is replaced by the light emitter of the photocoupler, the indicating circuit may realize an electrical isolation function by the help of the electrical isolation function of the photocoupler. If the LED lamp is directly used, as it is often mounted on a panel, in all the above-mentioned use methods, the LED lamp is alive, and may not be isolated from the capacitor C1. In the present application, the alternating current input is used, so that there is a risk that the user touches the LED lamp, resulting in potential hazard in the aspect of the safety standard.

Therefore, four embodiments below of the present application realize the electrical isolation function for the LED.

Sixth Embodiment

Figure 16:
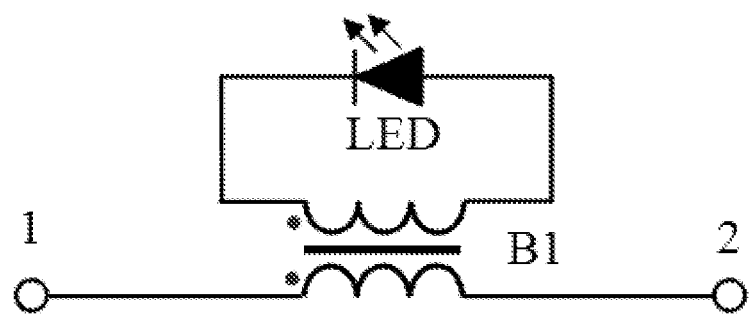
FIG. 16 is a schematic diagram of an indicating circuit in a sixth embodiment of the present application.

Referring to FIG. 16, the indicating circuit realizes a function of isolating an LED lamp from alternating current, and comprises a first terminal 1, a second terminal 2, a first transformer B1, a first light emitting diode LED and a first transformer B1 at least comprises a primary winding and a secondary winding. The first light emitting diode LED is connected in parallel with the secondary winding of the first transformer B1, and the terminal, which is connected with the cathode of the first light emitting diode LED, of the secondary winding is used as a dotted terminal. The terminal having a black dot in FIG. 16 is the marker of the dotted terminal. The dotted terminal corresponding to the primary winding is used as the first terminal 1, and the other terminal of the primary winding is used as the second terminal 2.

In various documents, only the transformer has the primary winding and the secondary winding. The indicating circuits in the technical solutions of the application only include the same transformer having the same functions, so that unless otherwise specified, the primary winding and the secondary winding are both windings of the first transformer B1.

The indicating circuit of the sixth embodiment is arranged into the switching power supplies having the active power factor correction in FIG. 2, FIG. 9 and FIG. 10. The sixth embodiment is an isolation version of the first embodiment, so that the working principle is slightly different.

The working principle of the sixth embodiment is slightly more complicated. The path of charging current generated by the capacitor C1 is similar to that as shown in FIG. 3. The inductor L is the primary winding of the transformer. Since the charging current is a low-frequency current, the charging current varies slowly. When in use, the transformer B1 is a high-frequency transformer, and even can be considered as a current transformer, where the primary winding of which is relatively low in inductance. The primary winding is called primary side for short below. A voltage drop generated on the primary side of the transformer B1 by the charging current is extremely small, only several mV or lower. This voltage induced to the secondary winding through the transformer B is related to a turn ratio. If the turn ratio is 1:10, the induced voltage of the secondary winding is far less than dozens mV because the transformer B is the high-frequency transformer during use, which is high in leakage inductance in a low-frequency stage, resulting in extremely low initial magnetic conductivity and extremely low energy transmission efficiency of a magnetic core. Furthermore, if the terminal marked by the dotted terminal is positive, the LED is in reversal of biasing, and does not emit light. As the induced voltage of the secondary winding is too low, the LED may not be broken down.

The exciting current $i_M$ of the main power stage is also as shown in FIG. 5. Only a very small part of the discharging current of the electrolytic capacitor C2 to the main power stage flows through the transformer B. The induced voltage of the secondary winding of the transformer B is far less than the forward conduction voltage of the LED, so that the LED does not emit light.

When the ESR of the electrolytic capacitor C2 has risen to 5.5Ω from the qualified 0.5Ω, namely the electrolytic capacitor C2 is on the edge of failure, and the inductance of the primary side of the transformer B1 is still 4.7 uH. Then, under the same condition, the primary side of the transformer B has an exciting current, with a peak value of 329 mA. The peak value appears at the time point $t_1$ or $t_2$ in FIG. 4, namely before the moment that the main power switching transistor in the main power stage is changed from the conducting state into the switched off state. As the current in the inductor may not be changed abruptly, the current of 329 mA in the primary side inductor of the transformer B1 would continuously flow forwards. If the ESR of the electrolytic capacitor C2 has risen to 5.5Ω, a voltage drop generated on the ESR by the current of 329 mA is the same as the above.

Referring to FIG. 16, the voltage of the second terminal 2 is also 2.13 V higher than that of the first terminal 1, so that the induced voltage of the secondary winding of the transformer B1 is also lower than that of the dotted terminal, namely the voltage of the anode of the LED is higher than that of the cathode. Even if the turn ratio of the transformer B1 is as low as 1:1, the LED emits light because of the forward induced voltage of the secondary winding of the transformer B, thereby forming current for lighting the LED in FIG. 16.

Another implementation mode of the working principle of the six embodiment which adopts the transformer B1 for isolation is as follows: before the moment that the main power switching transistor in the main power stage is changed from the conducting state into the switched off state, as the current in the inductor may not be changed abruptly, the current which has reached the peak value in the primary side inductor of the transformer B1 would continuously flow forwards, and the ESR of the electrolytic capacitor C2 has risen, and may not well absorb the exciting current of the primary side inductor of the transformer B. This current flows from the dotted terminal to the non-dotted terminal. At this time, the transformer B1 is operated as an energy storage inductor, and the part, which may not be absorbed, in the current may flow from the dotted terminal to the non-dotted terminal inside the secondary winding, thereby forming current for lighting the LED in FIG. 16. This is similar to the working principle of a fly-back power supply that it is the current driving the LED to emit light.

After the six embodiment, namely the indicating circuit in FIG. 16, is arranged into the switching power supplies having the active power factor correction in FIG. 2, FIG. 9 and FIG. 10, the switching power supplies having the active power factor correction may work normally.

The sixth embodiment realizes isolation from the alternating current, and also achieves the invention objective. At the electrification moment, it is most possible that the capacitor C1 is in a high-voltage state instead of a zero volt state. As the terminal voltage of the electrolytic capacitor C2 is zero, and may not be changed abruptly, the current in the primary side inductor of the transformer B1 is zero, and may not be changed abruptly. At the electrification moment, most of instantaneous voltage of the capacitor C1 may be applied to two ends of the primary side of the transformer B, and induced voltage of the secondary side may reversely break down the LED. Therefore, a seventh embodiment is to solve this problem.

Seventh Embodiment

Figure 17:
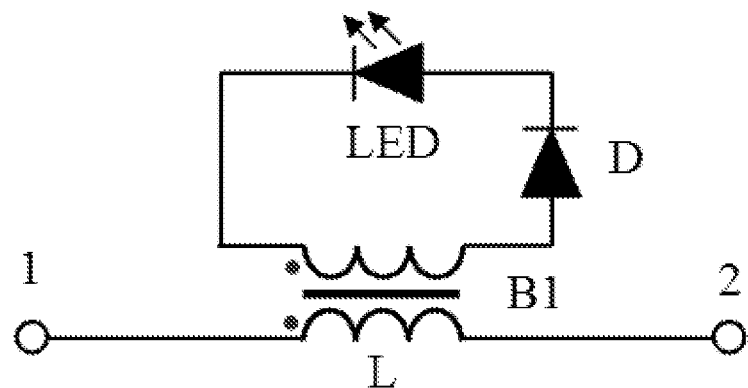
FIG. 17 is a schematic diagram of an indicating circuit in a seventh embodiment of the present application.

Referring to FIG. 17, on the basis of the sixth embodiment, a first diode D is further included. A connection relation is as follows: the first diode D is connected in series with the first light emitting diode LED in the same direction to form a first network which is connected in parallel with the secondary winding of the first transformer B1. Furthermore, the terminal, which is connected with the cathode, of the secondary winding is used as a dotted terminal. The dotted terminal corresponding to the primary winding is used as a first terminal 1, and the other terminal of the primary winding is used as a second terminal 2.

Figure 18:
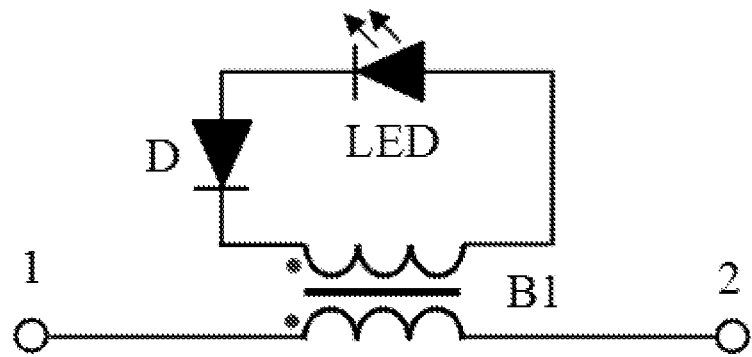
FIG. 18 is a schematic diagram of the indicating circuit in the seventh embodiment of the present application, namely the positions of an LED and a diode are switched.

FIG. 18 shows another mode of serial connection in the same direction.

The seventh embodiment is an isolation version of the third embodiment. The working principle for preventing reverse breakdown is introduced in the third embodiment, so that no more details will be described here. The indicating circuit of the seventh embodiment is arranged into the switching power supplies having the active power factor correction in FIG. 2, FIG. 9 and FIG. 10 to also achieve the invention objective. The seventh embodiment, namely the indicating circuit as shown in FIG. 17 or FIG. 18, may easily damage an LED or a light emitter in a photocoupler because of no current limiting resistor. Therefore, an eighth embodiment is to solve this problem.

Eighth Embodiment

Figure 19:
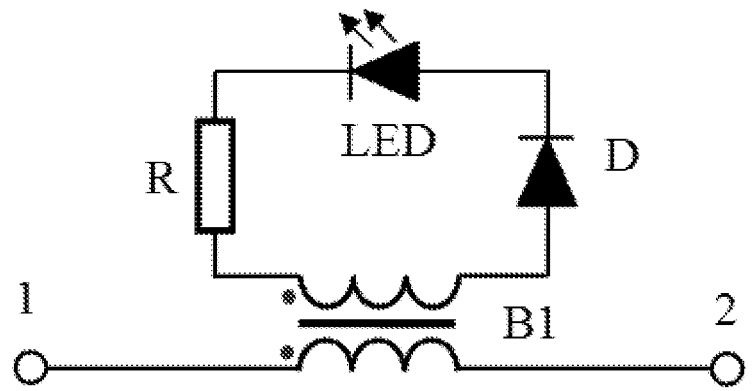
FIG. 19 is a schematic diagram of an indicating circuit in an eighth embodiment of the present application.

Referring to FIG. 19, on the basis of the seventh embodiment, a first resistor R is further included. A connection relation is as follows: the first diode D, the first light emitting diode LED and the first resistor R are connected in series in the same direction to form a second network which is connected in parallel with the secondary winding of the first transformer B1. Furthermore, the terminal, which is connected with the cathode of the second network, of the secondary winding is used as a dotted terminal. The dotted terminal corresponding to the primary winding is used as a first terminal 1, and the other terminal of the primary winding is used as a second terminal 2.

The eighth embodiment is an isolation version of the fourth embodiment. Even if the three devices are connected in series in the same direction, the unidirectional conduction characteristic is still realized. There are six serial connection modes according to a permuted combination method, and the modes will not be shown one by one here. After the eighth embodiment is arranged into the switching power supplies having the active power factor correction in FIG. 2, FIG. 9 and FIG. 10 according to the requirements in the technical solution, the switching power supplies having the active power factor correction may work normally.

Due to the final reason of the fourth embodiment, a ninth embodiment provides a solution.

Ninth Embodiment

Figure 20:
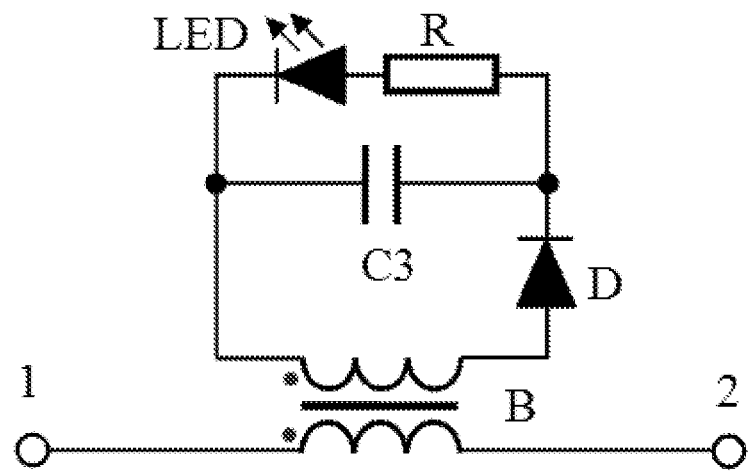
FIG. 20 is a schematic diagram of an indicating circuit in a ninth embodiment of the present application.

Referring to FIG. 20, on the basis of the eighth embodiment, a third capacitor C3 is further included. A connection relation is as follows.

The first light emitting diode LED and the first resistor R are connected in series, and then are connected in parallel with the third capacitor C3 to form a third network which is connected in series with the first diode D in the same direction to form a fourth network; and the fourth network is connected in parallel with the secondary winding of the first transformer B1. Furthermore, the terminal, which is connected with the cathode of the fourth network, of the secondary winding is used as a dotted terminal. The dotted terminal corresponding to the primary winding is used as a first terminal 1, and the other terminal of the primary winding is used as a second terminal 2.

Figure 21:
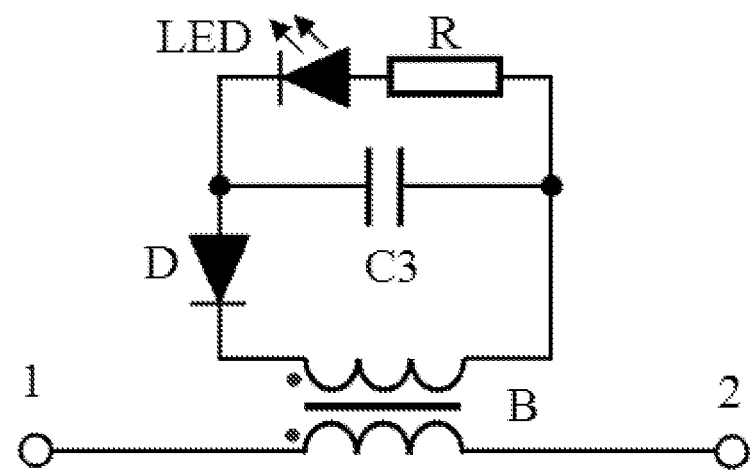
FIG. 21 is another implementation mode of the schematic diagram of the indicating circuit in the ninth embodiment, namely the positions of a diode D and a third network are switched.

The ninth embodiment is an isolation version of the fifth embodiment. The filtering working principle is the same as that of the fifth embodiment. The ninth embodiment provides four connection methods which may all achieve the invention objective. FIG. 21 shows another circuit in which the third network is then connected in series with the diode D in the same direction. There are also two methods for serial connection between the first light emitting diode LED and the first resistor R, and the methods will not be shown one by one here.

The ninth embodiment is arranged into the switching power supplies having active power factor correction in FIG. 2, FIG. 9 and FIG. 10 to also achieve the invention objective.

In the embodiments 6 to 9, the LED lamp is directly used, and is mounted on the panel. The LED lamp is not alive, and is isolated from input strong current, thereby meeting the requirements of the safety standard.

The transformer B1 may be a current transformer. According to actual measurement, even if the primary side includes one turn, the transformer B may also work, so as to reduce the cost of the current transformer. A solution with relatively low cost is that holes are formed in two sides of one lead wire on a circuit board, and are clamped with an EI or CC type magnetic core including a coiled secondary winding, so as to directly realize the function of the transformer B1.

It can be seen from the above that the present application may definitely solve the problems in the prior art to achieve expected beneficial effects with small-sized elements and low cost.

The above descriptions are only preferred implementation modes of the present application. It should be noted that the above-mentioned preferred implementation modes shall not be deemed as limitations to the present application. Ordinary people skilled in the art can further make a plurality of improvements and embellishments, such as connecting a resistor in series into the first diode, without departing from the spirit and scope of the present application. These improvements and embellishments shall fall within the scope of protection of the present application, and no more embodiments will be described here. The scope of protection of the present application shall be based on the scope defined by claims.

The invention claimed is:

1. A switching power supply having active power factor correction, comprising:
   a power factor correction circuit,
   a filter circuit,
   a main power stage,
   a first capacitor,
   an indicating circuit having two terminals, and
   an alternating current input,
   wherein the alternating current input is connected to the first capacitor through the power factor correction circuit, and then connected to the filter circuit through the indicating circuit,
   wherein the filter circuit is connected in parallel with the main power stage, wherein the filter circuit at least comprises a second capacitor used as an electrolytic capacitor, wherein the indicating circuit is formed by connecting a light emitting unit having unidirectional conductivity to a first inductor in parallel, and the indicating circuit is configured to allow the current direction of power supplied from the power factor correction circuit to the main power stage through the first inductor is opposite to the conducting direction of the light emitting unit.

2. The switching power supply having the active power factor correction according to claim 1, wherein the light emitting unit is a light emitting diode.

3. The switching power supply having the active power factor correction according to claim 1, wherein the light emitting unit is formed by a light emitting diode and a first diode connecting in series in a same direction.

4. The switching power supply having the active power factor correction according to claim 1, wherein the light emitting unit is formed by a light emitting diode, a first diode and a first resistor connecting in series in the same direction.

5. The switching power supply having the active power factor correction according to claim 1, wherein the light emitting unit comprises a light emitting diode, a first diode, a first resistor and a third capacitor, wherein a connection relation among which is as follows: the light emitting diode and the resistor are connected in series with each other, and then connected in parallel with the third capacitor to form a third network which is then connected in series with the diode in the same direction, thereby forming the light emitting unit.

6. A switching power supply having active power factor correction, comprising:
a power factor correction circuit,
a filter circuit,
a main power stage,
a first capacitor,
an indicating circuit having two terminals, and
an alternating current input,
wherein the alternating current input is connected to the first capacitor through the power factor correction circuit, and then connected to the filter circuit through the indicating circuit,
wherein the filter circuit is connected in parallel with the main power stage,
wherein the filter circuit at least comprises a second capacitor used as an electrolytic capacitor,
wherein the indicating circuit comprises a first terminal, a second terminal, a first transformer and a first light emitting diode,
wherein the first transformer at least comprises a primary winding and a secondary winding,
wherein the first light emitting diode is connected with the secondary winding of the first transformer in parallel, and the terminal, which is connected with the cathode of the first light emitting diode, of the secondary winding is used as a dotted terminal, the dotted terminal corresponding to the primary winding is used as the first terminal, and the other terminal of the primary winding is used as the second terminal, and the indicating circuit ensures that current input by direct current flows in through the first terminal, then flows through the primary winding, and flows out from the second terminal.

7. The switching power supply having the active power factor correction according to claim 6, further comprising a first diode, wherein a connection relation is as follows: the first diode is connected in series with the first light emitting diode in the same direction to form a first network, the first network is connected in parallel with the secondary winding of the first transformer, and the terminal, which is connected with the cathode of the first network, of the secondary winding is used as the dotted terminal, the dotted terminal corresponding to the primary winding is used as the first terminal, and the other terminal of the primary winding is used as the second terminal.

8. The switching power supply having the active power factor correction according to claim 7, further comprising a first resistor, wherein a connection relation is as follows: the first diode, the first light emitting diode and the first resistor are connected in series in the same direction to form a second network, the second network is connected in parallel with the secondary winding of the first transformer, and the terminal, which is connected with the cathode of the second network, of the secondary winding is used as the dotted terminal, the dotted terminal corresponding to the primary winding is used as the first terminal, and the other terminal of the primary winding is used as the second terminal.

9. The switching power supply having the active power factor correction according to claim 8, further comprising a third capacitor, wherein a connection relation is as follows: the first light emitting diode and the first resistor are connected in series, and then connected in parallel with the third capacitor to form a third network which is then connected in series with the first diode in the same direction to form a fourth network, the fourth network is connected in parallel with the secondary winding of the first transformer, and terminal, which is connected with the cathode of the fourth network, of the secondary winding is used as the dotted terminal, and the dotted terminal corresponding to the primary winding is used as the first terminal, and the other terminal of the primary winding is used as the second terminal.

10. The switching power supply having the active power factor correction according to claim 2, further comprising a second resistor connected in parallel to two ends of the light emitting diode.

11. The switching power supply having the active power factor correction according to claim 2, wherein the light emitting diode is a light emitter in a photocoupler.

12. The switching power supply having the active power factor correction according to claim 3, further comprising a second resistor connected in parallel to two ends of the light emitting diode.

13. The switching power supply having the active power factor correction according to claim 4, further comprising a second resistor connected in parallel to two ends of the light emitting diode.

14. The switching power supply having the active power factor correction according to claim 5, further comprising a second resistor connected in parallel to two ends of the light emitting diode.

15. The switching power supply having the active power factor correction according to claim 6, further comprising a second resistor connected in parallel to two ends of the light emitting diode.

16. The switching power supply having the active power factor correction according to claim 7, further comprising a second resistor connected in parallel to two ends of the light emitting diode.

17. The switching power supply having the active power factor correction according to claim 8, further comprising a second resistor connected in parallel to two ends of the light emitting diode.

18. The switching power supply having the active power factor correction according to claim 9, further comprising a second resistor connected in parallel to two ends of the light emitting diode.

19. The switching power supply having the active power factor correction according to claim 3, wherein the light emitting diode is a light emitter in a photocoupler.

20. The switching power supply having the active power factor correction according to claim 4, wherein the light emitting diode is a light emitter in a photocoupler.

* * * * *